US009992662B1

(12) United States Patent
Hua et al.

(10) Patent No.: US 9,992,662 B1
(45) Date of Patent: Jun. 5, 2018

(54) METHOD AND APPARATUS FOR ENROLLING CONNECTED ELECTRONIC DEVICES IN A CONNECTED HOME MONITORING-SECURITY SYSTEM

(71) Applicant: Honeywell International Inc., Morris Plains, NJ (US)

(72) Inventors: Weifeng Hua, Shanghai (CN); Bo Sun, Shanghai (CN); George Li, Shanghai (CN)

(73) Assignee: Honeywell International, Inc., Morris Plains, NJ (US)

( * ) Notice: Subject to any disclaimer, the term of this patent is extended or adjusted under 35 U.S.C. 154(b) by 0 days. days.

(21) Appl. No.: 15/452,359

(22) Filed: Mar. 7, 2017

(51) Int. Cl.
| | | |
|---|---|---|
| *H04W 8/00* | (2009.01) | |
| *H04B 17/00* | (2015.01) | |
| *H04W 76/02* | (2009.01) | |
| *H04B 17/318* | (2015.01) | |
| *G06F 3/0482* | (2013.01) | |
| *G06F 3/0484* | (2013.01) | |
| *G06F 3/0488* | (2013.01) | |
| *G05B 19/048* | (2006.01) | |

(52) U.S. Cl.
CPC .......... *H04W 8/005* (2013.01); *G05B 19/048* (2013.01); *G06F 3/0482* (2013.01); *G06F 3/0488* (2013.01); *G06F 3/04847* (2013.01); *H04B 17/318* (2015.01); *H04W 76/021* (2013.01); *G05B 2219/23297* (2013.01); *G05B 2219/2642* (2013.01)

(58) Field of Classification Search
CPC .... B60R 25/102; G08B 25/009; G08B 25/10; G08B 13/19684; G08B 15/004; G08B 21/02; G08B 21/0202; G08B 25/016; G08B 25/008; G08B 13/1427; G08B 21/0247; G08B 19/00; G08B 13/00; H04W 24/00; H04W 24/02
See application file for complete search history.

(56) References Cited

U.S. PATENT DOCUMENTS

| | | | | |
|---|---|---|---|---|
| 7,363,031 | B1 * | 4/2008 | Aisa | H02J 13/0079 340/3.1 |
| 7,904,187 | B2 * | 3/2011 | Hoffberg | G05B 15/02 370/200 |
| 8,742,694 | B2 | 6/2014 | Bora et al. | |
| 9,191,886 | B2 * | 11/2015 | Ludlow | H04W 48/18 |
| 9,635,545 | B2 * | 4/2017 | Naqvi | H04W 8/22 |
| 2008/0242220 | A1 * | 10/2008 | Wilson | H04M 1/7253 455/3.04 |
| 2014/0149873 | A1 | 5/2014 | Wilson et al. | |
| 2015/0351008 | A1 * | 12/2015 | Mayor | H04W 48/16 455/41.2 |
| 2016/0173937 | A1 | 6/2016 | Shih et al. | |

* cited by examiner

*Primary Examiner* — Sharad Rampuria
(74) *Attorney, Agent, or Firm* — Wood, Phillips, Katz, Clark & Mortimer

(57) ABSTRACT

A system and method (10) are provided for enrolling electrical control devices (12) in a system (14) for wirelessly controlling and monitoring a plurality of electrical control devices (12) located throughout a building (16). The system (10) includes a portable electronic control panel (20) that connects wirelessly to the devices (12). The system (10) automatically creates a list of the devices (12) based their wireless signal strength and allows a user to select and operate each of the devices (12) one at a time to thereby verify the identity of each device (12) and input a user created identifier for each device (12) into the system (10).

9 Claims, 4 Drawing Sheets

METHOD AND APPARATUS FOR ENROLLING CONNECTED ELECTRONIC DEVICES IN A CONNECTED HOME MONITORING-SECURITY SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure relates to building/home monitoring/control systems, such a home security systems, that provide central monitoring/control of a plurality of electronic devices located throughout a building/home.

BACKGROUND

Increasingly, homes and other buildings are becoming "connected" wherein a plurality of electronic devices in the home are connected to a home monitoring/control system, such as a home security system, that allows central monitoring control of the electronic devices by a user. Examples of such electronic devices includes dimmer and relay switches, smoke detectors, fire alarms, thermostats and other heating, venting and air conditioning components, and cameras. Often in such systems, the monitored electronic devices are connected to electrical power lines and users will turn off the electrical power supply when installing the electronic devices. This is especially true for electrical control devices, such as switches, relays, rheostats, etc., that control the flow of electricity to an electrical circuit. After such electronic devices are connected to power lines and supplied with electrical power, they must be enrolled into the central monitoring/control system by having the system identify each of the new devices by making an electronic signal connection, typically a wireless signal connection, and by providing a user readable identifier to the central control system. The user readable identifier allows a user to know which of the electronic devices the user is attempting to control or monitor at any given time in the central system. Because it is common for several electronic devices to be added at one time, it can be difficult for a user to know prior to enrollment which wirelessly connected electronic device is which, and particularly, which electronic devices are located in one room, which electronic devices are located in another room, which electronic devices are which within a particular room, and the type of specific electronic device that is located within a room. It often requires two people who can communicate with each other to verify which electronic device has been connected to the system so that the device may be accurately identified with respect to the type and location in the central system.

SUMMARY

In accordance with one feature of the disclosure, a method is provided for enrolling electronic devices in a system for wirelessly controlling and monitoring a plurality of electrical control devices located throughout a building. The system includes an electronic control panel that connects wirelessly to a plurality of electrical control devices and has a user display to display the status of the electrical control devices and a user input to allow a user to input control commands to the electrical control devices. The method includes the sequential steps of: (a) physically moving the control panel to a room in the building having one or more of the plurality of electrical control devices; (b) automatically detecting the wireless signal strength received by the control panel from each of the electrical control devices; (c) automatically creating a list of the electrical control devices based on the wireless signal strength received by the control panel from each electrical control device, the list being ordered from strongest to weakest signal strength received by the control panel; (d) automatically displaying the list on the user display; (e) in response to electronic signals from the user input, selecting an electrical control device from the list and transmitting wireless signals from the control panel to the selected electrical control device to operate the selected electrical control device to thereby allow a user to verify the identity of the selected electrical control device; and (f) in response to electronic signals from the user input, inputting a user created identifier for the selected electrical control device into an electronic database after the identity of the selected electrical control device has been verified by the user, the user created identifier allowing the user to correctly identify the selected electrical control device when the user desires to operate the electrical control device via the control panel.

According to one feature, steps (a) through (f) are repeated for multiple rooms in the building.

In one feature, the method further includes: (g) repeating steps (e) and (f) for other of the electrical control devices in the room.

As one feature, the method further includes the step of automatically displaying each of the user created identifiers on the user display after each user created identifier is entered into the electronic database.

In one feature, steps (a) through (g) are repeated for multiple rooms in the building.

According to one feature, prior to step (a) the method further includes the step of adjusting the signal strength of each of the electrical control devices to limit the ability to form a wireless connection between each of the electrical control devices and the control panel when the control panel is not located in the same room as each of the electrical control devices.

In a further feature, after step (g), the method further includes the step of adjusting the strength of each of the electrical control devices to allow the forming of a wireless connection between each of the electrical control devices and the control panel when the control panel is located outside of the room from each of the electrical control devices.

As one feature, after steps (a) through (g) are repeated for multiple rooms, the method further includes the step of adjusting the strength of each of the electrical control devices to allow the forming of a wireless connection between each of the electrical control devices and the control panel when the control panel is located outside of the room from each of the electrical control devices.

In one feature, at least some of the electrical control devices are electrical switches that control the flow of electricity to an electrical circuit.

According to one feature, the user display and the user input are a touchscreen display.

As one feature, a non-transitory computer readable storage medium is provided including instructions for implementing any of the above features in an electronic processor executing the instructions.

In one feature, a system for providing enrolling electronic devices in a system for wirelessly controlling and monitoring a plurality of electrical control devices located throughout a building is provided. The system includes a control panel having a user input, a user display, and circuitry for sending and receiving wireless signals to and from a plurality of electrical control devices and an electronic processor is configured to implement any of the above features.

Other features and advantages will become apparent from a review of the entire specification, including the appended claims and drawings.

DETAILED DESCRIPTION

Figure 1:
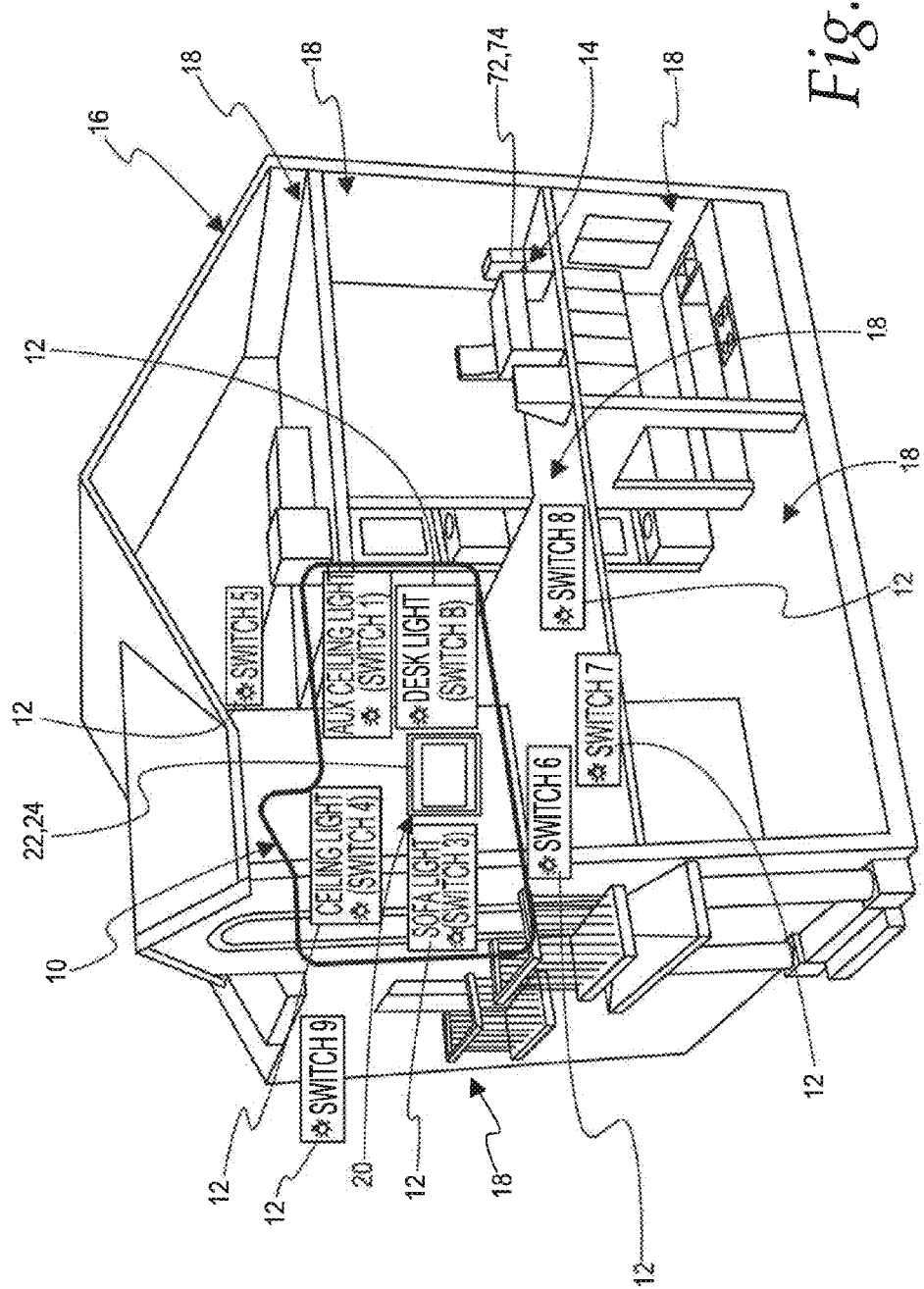
FIG. 1 is a perspective view providing a somewhat diagrammatic illustration of a building/home incorporating a plurality of monitored electronic devices that are monitored/controlled by a central monitoring/security system and including a system/method according to this disclosure for enrolling the monitored electronic devices into the central monitoring/security system, with a wall of the building removed for purposes of illustration.
Figure 2:
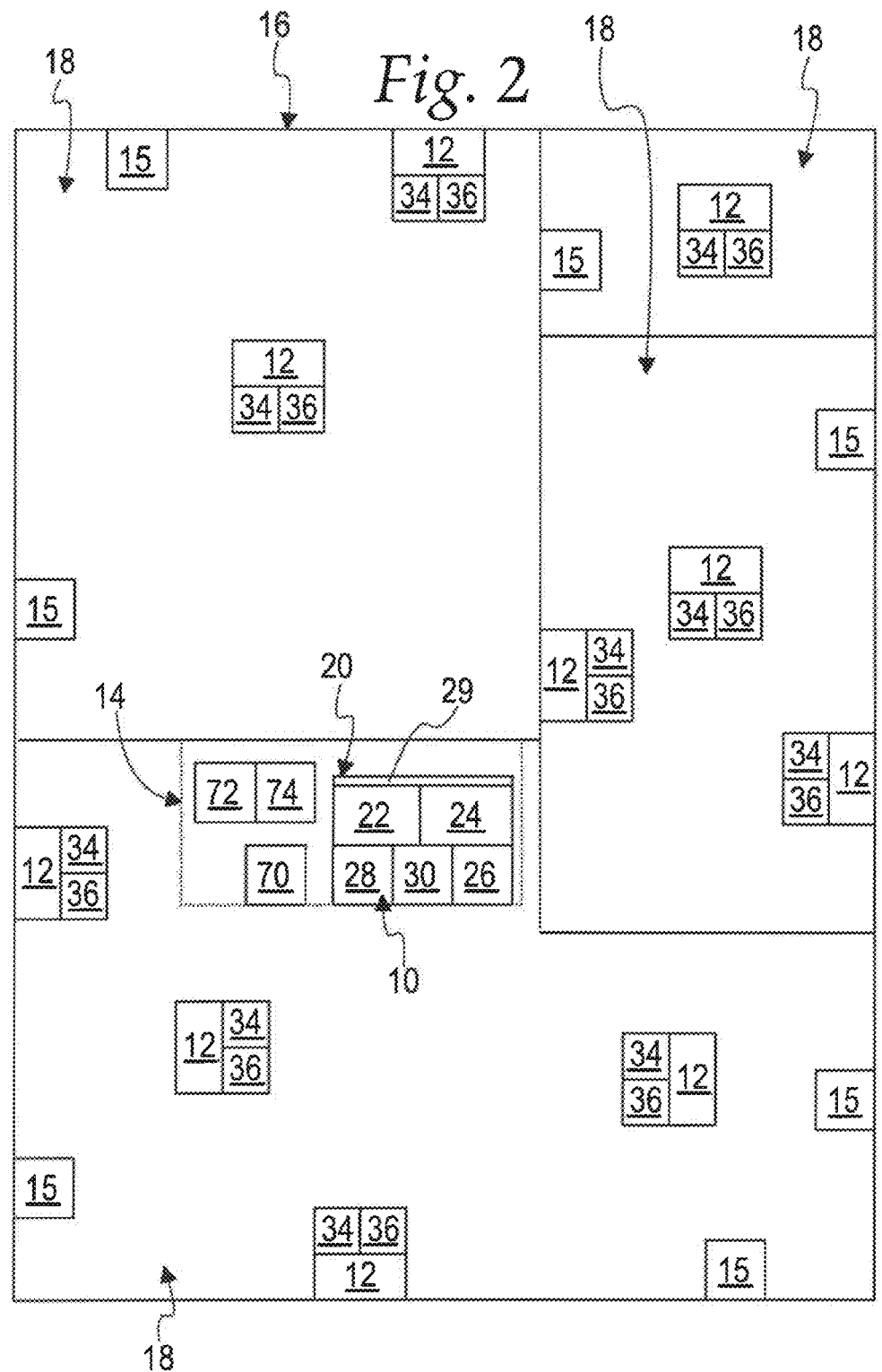
FIG. 2 is a diagrammatic block diagram illustrating the components of the system utilized in FIG. 1 in a building/home incorporating the system.

With reference to FIGS. 1 and 2, a system and method 10 are illustrated for enrolling electrical control devices 12 into a connected home/building monitoring/control system 14 that allows a user to centrally control and monitor electronic devices 15 throughout a building 16, including the electrical control devices 12 that are enrolled into the system 14. The building 16 will typically include a number of different areas/rooms 18, with each of the rooms 18 containing one or more of the electrical control devices 12. The system 10 includes a portable electronic control panel 20 that connects wirelessly to the electrical control devices 12 and to other connected electronic devices 15 in the building 16 and that serves as a central control/monitoring device of the monitoring/control system 14. It should be understood that as used herein, the term electrical control device 12 includes any electronic/electrical device capable of controlling the flow of electricity to an electrical circuit and/or controlling an electrical circuit, and will typically be in the form of a switch, a relay, and/or a rheostat. Further in this regard, it should be understood that the devices 12 can be in the form of a wall mounted switch, relay and/or rheostat, or could be in the form of a switch, relay and/or rheostat that is part of a larger device, such as, for example, a household appliance, a heating, venting and air conditioning component, or a security system device (such as a camera).

Figure 4A:
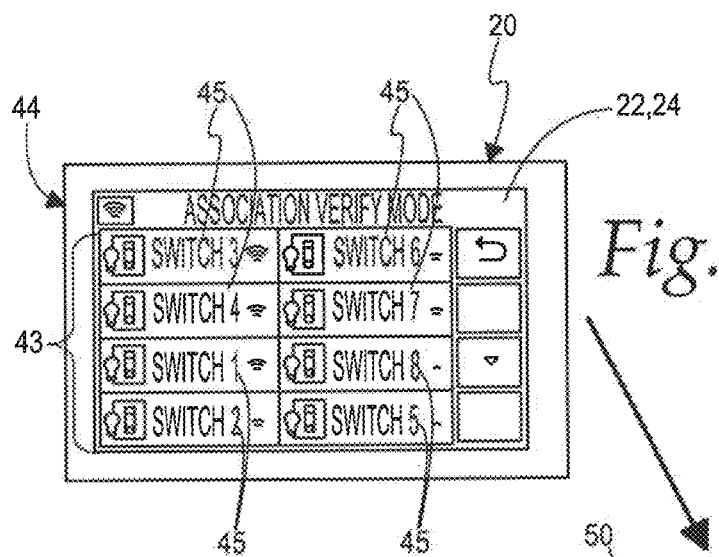
FIGS. 4A-4D are a sequence of views showing a touchscreen component utilized in the system/method of this disclosure and further illustrating the method according to this disclosure.

As best seen in FIGS. 2 and 4A, the portable electronic control panel 20 includes a user display 22 to display the status of the electrical control devices 12 and other electronic devices 15 and a user input 24 to allow a user to input control commands to the electrical control devices 12. In the illustrated embodiment of FIGS. 1 and 4A, the display 22 and input 24 are provided in the form of a touchscreen display such as is commonly employed in portable electronic devices such as smartphones and tablet computers. However, it should be understood that the user display 22 and the user input 24 can be provided in any suitable forms, as for example, the user display 22 can be provided in the form of a LCD screen that is not touch capable, and as yet a further example, the user input can be provided in the form of a keypad and/or microphone for voice commands, both of which can either be provided in lieu of or in combination with a touchscreen user input. The control panel 20 will also include a suitable transceiver 26, typically in the form of transmitter circuitry and receiver circuitry, that allows the control panel 20 to transmit wireless signals to each of the electrical control devices 12 and to receive wireless signals from each of the electrical control devices 12. Typically, the control panel 20 will also include some suitable form of electronic memory 28, a suitable power supply 29, such as a rechargeable battery 29, and an electronic processor 30 configured to send and receive appropriate control signals to, from, and between the user display 22, the user input 24 and the transceiver 26. It should be understood that the transceiver 26, electronic memory 28, power supply 29, and processor 30 can be of any suitable type, many of which are known and the details of which are not critical to an understanding of the system/method 10 disclosed herein.

Similarly, each of the electrical control devices 12 will include a suitable transceiver 34, again typically in the form of transmitter circuitry and receiver circuitry, to allow each of the devices 12 to transmit wireless signals to the transceiver 26 of the control panel 20 and to receive wireless signals from the transceiver 26 of the control panel 20. The devices 12 will also include an appropriate electronic processor or control circuitry 36 that will operate the device 12 in response to the wireless signals received from the transceiver 26 of the control panel 20 and transmit wireless signals providing the current operational status/configuration of the devices 12 from the transceiver 34 to the transceiver 26 of the control panel 20. Again, it should be understood that there are many suitable and known types of transceivers 34 and control circuitry 36 that can be utilized for the devices 12, and the details of such are not necessary for an understanding of the system/method 10 disclosed herein.

It should be understood that the system 10, including the transceivers 26 and 36 can be configured to transmit wireless signals using any suitable wireless protocol, many of which are known, and examples of which include Z-wave wireless protocols, Bluetooth protocols in the ISM band from 2400 to 2800 megahertz, ZigBee protocols such as IEEE 802.15.4, ultra wide band protocols such as IEEE 802.14.4a, and Wi-fi or wireless local area network protocols, such as IEEE 802.11 standards.

Figure 3:
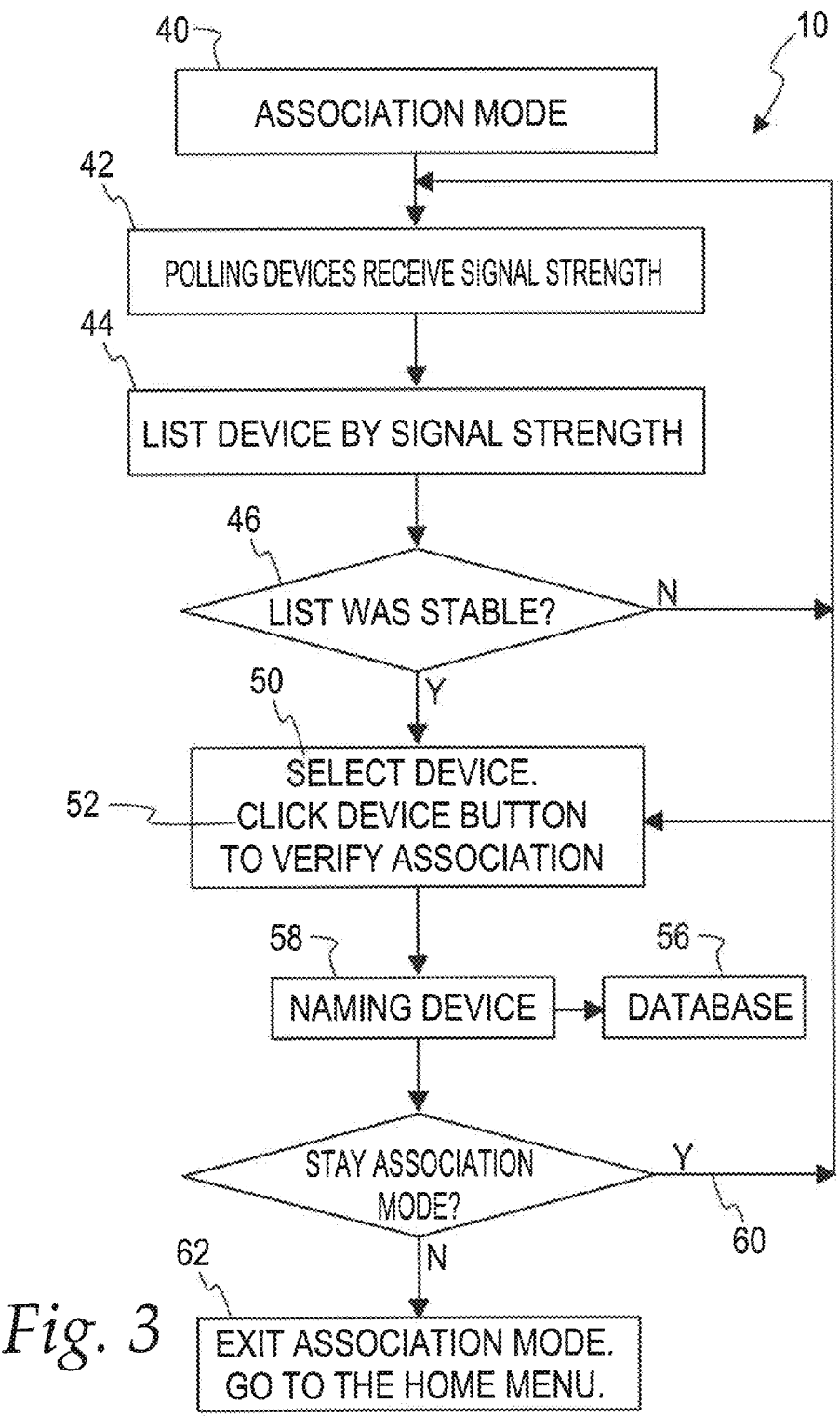
FIG. 3 is a flow chart illustrating the method according to this disclosure.

According to the method 10 of this disclosure, the control panel 20 is put into an enrollment/association mode in response to a user request submitted via the user input 24, as shown at 40 in FIG. 3. Either before or after initiating the enrollment/association mode, the control panel 20 is carried by a user into one of the rooms 18 of the building 16 having one or more of the electrical control devices 12. While located in the room 18, polling of the devices 12 is performed wherein the wireless signal strength received by the control panel 20 is automatically detected from each of the electrical control devices 12, as seen at 42 in FIG. 3. As is conventional, the wireless signal from each of the devices 12 will include a unique hard coded identifier, such as a serial number identifier, for each device 12. Using a suitable sorting algorithm, many of which are known, the system 10 then automatically creates a list 43 of the electrical control devices 12 based on the wireless signal strength received by the control panel 20 from each of the electrical control devices 12, with the list 43 being ordered from strongest to weakest signal strength received by the control panel 20, as shown at 44 in FIGS. 3 and 4A. In creating the list 43, the system 10 will repeatedly check to see if the list 43 is stable by re-polling the devices 12 and checking to see if the list 43 has changed from the last iteration, as shown at 46 in FIG. 3, The system 10 automatically displays the list 43 on the display 22, with the system 10 assigning a temporary identifier 45 to each of the electrical control devices 12 on the list 43, as shown in FIG. 4A, and associating the temporary identifier 45 with the unique hard coded identifier of the corresponding device 12, It should be appreciated that the temporary identifiers 45 shown in FIG. 4A correspond to the temporary identifiers for the switches 12 shown in FIG. 1. It should be understood that the list 43 will include all of the electrical control devices 12 from which a wireless signal is received by the controller 20, including electrical control devices 12 that are not in the room 18.

Figure 4B:
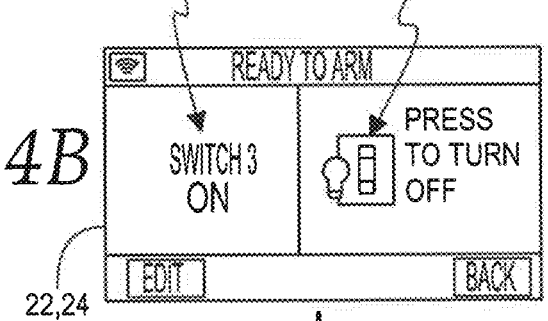
Figure 4C:
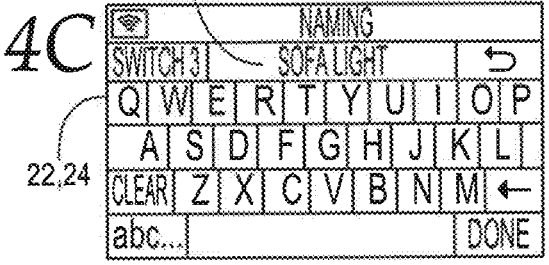
Figure 4D:
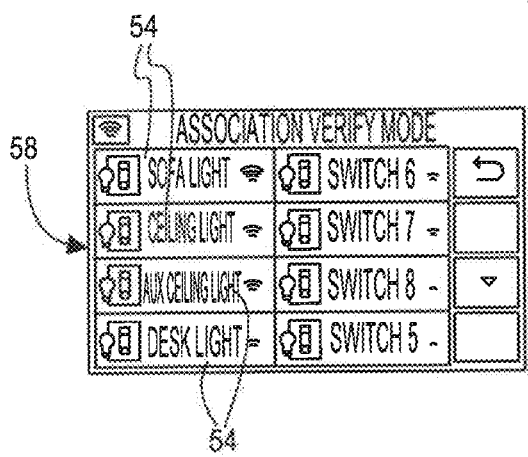

As shown at 50 in FIGS. 3 and 4B, the user selects one of the electrical control devices 12 using the user input 24 and, in response, the system 10 will automatically display the selected electrical control device 12 on the user display 22, Next, the user inputs a control command via the user input 24, which then causes the system 10 to automatically transmit wireless control signals from the transceiver 26 to the transceiver 34 of the selected electrical control device 12 to operate the selected electrical control device 12, as shown at 52 in FIGS. 3 and 4. By operating the selected electrical device 12, such as by turning a light switch 12 on and off, the user is able to verify which of the electrical devices 12 in the room 18 corresponds to the selected electrical device 12 and then enter a user created identifier 54, typically a text name, for the selected electrical device 12 into the user input 24, with the system 10 then automatically inputting the user created identifier 54 into an electronic database 56 and replacing the temporary alias 45 provided on the list 43, as shown at 58 in FIGS. 3 and 4C. In this regard, it should be appreciated that the user created identifier 54 is associated in the database 56 with the hard coded identifier for the corresponding device 12 and that the temporary aliases 45 and hard coded identifiers will have automatically been entered into the database 56 during the process of polling the devices 12 and creating the list 43. In the illustrated embodiment, after a user enters the user created identifier 54 for each selected electrical control device 12, the system 10 automatically displays the user created identifier 54 by updating the list 43 on the user display 22, as shown at 58 in FIG. 4D. It should be appreciated that the user created identifiers 54 shown in FIG. 4D correspond to the user created identifiers shown for each of the switches 12 in FIG. 1. As seen in FIGS. 1 and 4D, the user created identifiers 54 ideally have a logical connection to the location/function of the device 12 so as to allow a user to quickly determine which device 12 in the system 14 is being monitored/controlled during any particular operation of the system 14.

If the user believes there may be more electrical control devices 12 in the room 18, the user can stay in the association mode and select the next device 12 on the list 43, and repeat the above-described process, as shown at 60 in FIG. 4. In this regard, for any given room 18, the user will typically start by selecting the device 12 at the top of the list 43, which has the strongest wireless signal, and then work down the list 43 from there until all of the electrical control devices 12 in the room 18 have been identified and enrolled in the system 10. After a user has verified and entered a user created identifier 54 for all of the electrical devices 12 in one of the rooms 18 of the building 16, the user can then carry the control panel 20 into another room 18 of the building 16 and repeat the above described process. The user can continue doing so for all of the rooms 18 in the building 16 that have devices 12 that need to be identified and enrolled into the system 10. The user can exit the association mode when the user no longer desires to identify and enroll additional electrical control devices 12 into the system 10, such as when there are no more unenrolled devices in a room 18 or the building 16, as shown at 62 in FIG. 4.

As an option, the system 10 can be configured to allow a user to adjust the wireless signal strength of each of the electrical control devices 12 to limit the ability to form a wireless connection between each of the electrical control devices 12 and the control panel 20 when the control panel 20 is not located in the same room 18 as each of the electrical control devices 12. This can be beneficial in that it would shorten the number of electrical control devices 12 that are contained on the list 43 shown on the display 22 when a user is attempting to enroll the electrical control devices 12 in any particular room 18, which should simplify the process for the user. Further in this regard, after a user has enrolled all of the electrical devices 12 that the user desires into the system 10, the system 10 can be configured to allow a user to adjust the wireless signal strength of each of the electrical control devices 12 to allow the forming of a wireless connection between each of the electrical control devices 12 and the control panel 20 when the control panel 20 is located outside of the rooms 18 that contain each of the electrical devices 12.

It should be understood that this a nontransitory computer readable storage medium 70 can be provided that includes the instructions for implementing the automatic operations of the system/method 10 described herein in an electronic processor that executes the instructions. Furthermore, in some applications it will be desirable for the automatic operations performed by the system/method 10 to be executed/implemented by the processor 30 and memory 28 within the control panel 20, while in other applications it will be desirable for the automatic operations performed by the system/method 10 to be executed/implemented by a remote processor 72 and memory 74 that are connected by wireless control and data signals to the control panel 20. In this regard, in some applications it will be desirable for the remote processor 72 and memory 74 to be located within the building, as shown in FIGS. 1 and 2, while in other applications it will be desirable for the remote processor 72 and memory 74 to be located somewhere other than within the building 16. It should further be understood that the database 56 will typically be stored in one of the electronic memories 28,74.

It should be appreciated that the disclosed system/method 10 allow a user to easily identify electrical control devices 12 after the devices 12 have been connected to an electrical supply within a building 16 and to thereby enroll the devices 12 into a home/building monitoring/control system 14, with each electrical control device 12 having a user created identifier 54 that allows a user to easily determine which electrical control device 12 is being monitored/controlled within the system 14.

It should be understood that while specific embodiments have been shown herein, the scope of this disclosure includes embodiments that are not specifically shown herein and that no limitation to a specific embodiment is intended unless expressly recited in one of the appended claims.

The invention claimed is:

1. A method of enrolling electronic devices in a system for wirelessly controlling and monitoring a plurality of electrical control devices located throughout a building, the system including an electronic control panel that connects wirelessly to the plurality of electrical control devices and has a user display to display the status of the electrical control devices and a user input to allow a user to Input control commands to the electrical control devices; the method comprising the sequential steps of:

(a) physically moving the control panel to a room in the building having one or more of the plurality of electrical control devices;

(b) automatically detecting the wireless signal strength received by the control panel from each of the electrical control devices;

(c) automatically creating a list of the electrical control devices based on the wireless signal strength received by the control panel from each electrical control device, the list being ordered from strongest to weakest signal strength received by the control panel;

(d) automatically displaying the list on the user display; and (e) in response to electronic signals from the user input, selecting an electrical control device from the list and transmitting wireless signals from the control panel to the selected electrical control device to operate the selected electrical control device to thereby allow a user to verify the identity of the selected electrical control device; and (f) in response to electronic signals from the user input, inputting a user created identifier for the selected electrical control device into an electronic database after the identity of the selected electrical control device has been verified by the user, the user created identifier allowing the user to correctly identify the selected electrical control device when the user desires to operate the electrical control device via the control panel;

wherein steps (a) through (f) are repeated for multiple rooms in the building;

wherein the step of: (g) repeating steps (e) and (f) for other of the electrical control devices in the room;

wherein at least some of the electrical control devices are electrical switches that control the flow of electricity to an electrical circuit.

2. The method of claim 1 further comprising the step of automatically displaying each of the user created identifiers on the user display after each user created identifier is entered into the electronic database.

3. The method of claim 1 wherein steps (a) through (g) are repeated for multiple rooms in the building.

4. The method of claim 1 wherein prior to step (a) the method further comprises the step of adjusting the signal strength of each of the electrical control devices to limit the ability to form a wireless connection between each of the electrical control devices and the control panel when the control panel is not located in the same room as each of the electrical control devices.

5. The method of claim 4 wherein after step (g), the method further includes the step of adjusting the strength of each of the electrical control devices to allow the forming of a wireless connection between each of the electrical control devices and the control panel when the control panel is located outside of the room from each of the electrical control devices.

6. The method of claim 4 wherein after steps (a) through (g) are repeated for multiple rooms, the method further comprises the step of adjusting the strength of each of the electrical control devices to allow the forming of a wireless connection between each of the electrical control devices and the control panel when the control panel is located outside of the room from each of the electrical control devices.

7. The method of claim 1 wherein the user display and the user input are a touchscreen display.

8. The method of claim 1 in an electronic processor executing the instructions further comprising instructions for implementing in a non-transitory computer readable storage medium.

9. The system for providing enrolling electronic devices in the system for wirelessly controlling and monitoring a plurality of electrical control devices located throughout a building, the system comprising:

a control panel having a user input, a user display, and circuitry for sending and receiving wireless signals to and from a plurality of electrical control devices; and an electronic processor configured to implement the method of claim 1.

* * * * *